Patented Mar. 13, 1928.

1,662,741

UNITED STATES PATENT OFFICE.

DANIEL GARDNER, OF WEYBRIDGE, ENGLAND.

PAINTS, ENAMELS, JAPANS, AND THE LIKE.

No Drawing. Application filed August 6, 1922, Serial No. 656,119, and in Great Britain August 21, 1922.

This invention relates to improvements in paints, enamels, japans and the like, and has for its object the provision of a non-aqueous colloidal lead-free paint, and a method of manufacturing such paint, more particularly white and light shades of paint, from oxides of titanium, zirconium, molybdenum, cerium, thorium, tungsten, vanadium, niobium, tantalum or uranium, and other metals except lead of the fourth and higher groups of the periodic system. When using such oxides for making up a pigment, special care has to be taken with regard to the ingredients from which the proposed pigment is to be formed.

In my prior British Patent No. 195,996, I describe a process for manufacturing paints containing as pigments compounds of metals of the fourth, fifth and sixth groups of the periodic system, in which the filler and base components used are both compounds of metals of the same group. (It is to be noted that I do not herein claim any matter which is claimed or described in my prior British Patent 195,996). In contradistinction to this, the present invention primarily consists in a non-aqueous colloidal lead-free paint, enamel, japan or the like, and the method of manufacturing the same, in which all constituents of the pigment introduced into the vehicle are compounds of the same metal, the oxide of the base constituent of which pigment is positively charged relatively to the charge carried by the oxide or oxides forming the filler.

The invention also consists in a paint, enamel, japan or the like of the kind indicated in the preceding paragraph, and the method of manufacturing the same, in which all the filler ingredients of the pigment are calcined in the presence of the base used, and the vehicles are preferably pretreated in the presence of the same base.

The invention also consists in a paint, enamel, japan or the like of the kind indicated above, and the method of manufacturing the same, in which the ingredients are mixed in molecular proportions so that upon application of the paint, no galvanic action can take place.

The invention further consists in the non-aqueous colloidal lead-free paints, enamels, japans and the like, when manufactured by the processes herein described and claimed.

It is to be understood that throughout the specification the terms, base, filler, and pigment are to be interpreted as follows:

Base.

Base is the substance which gives the pigment its covering power, its color, its opacity, and its tinctorial power.

Filler.

Filler is the substance used either to adulterate the paint for the purposes of cheapness, or to confer some special properties other than that of tinting or opacity. In certain cases the filler also has covering power.

Pigment.

Pigment consists of a mixture of base and filler, and in this invention the substances forming the pigments are calcined together.

Electric charge.

In order to explain this invention, it is assumed that the pigment in the coating composition is in a colloidal solution. Substances in such solutions are known to be electrically charged, and their relative charge is either positive or negative, according to the substance with which they are compared. Throughout the specification the electric charges referred to are always to be understood as relative charges. The charge carried by the oxide forming the base is positive relatively to the charge carried by the compounds forming the filler. As an example, it may be stated that titanium oxide when in this condition is positively charged when compared with silica, but negatively charged when compared with titanium trioxide ($Ti_2O_3$), and calcium oxide is positively charged when compared with titanium oxide. It is to be borne in mind that individually the oxides carry their electric charge potentially, and the actual charge appears only after the introduction of the pigment into the vehicle, in which the pigment constituents are present in colloidal state. The potentially positively and negatively charged oxides form together in the colloidal state the stable compound.

Bearing these points in mind, and in order that the carrying of the invention into effect may be understood, I will now describe in detail the modifications thereof, and then the precautions to be taken when producing paints incorporating one or other of the examples which will now be given.

Taking first the case where the base having a positive charge relatively to the charge carried by the compounds forming the filler comprises an oxide with covering power, and where the oxide or oxides acting as a filler have a negative charge relatively to the charge carried by the oxide forming the base, and are an element or elements of the same group of the periodic system as the metal occurring in the base. These oxides, when undergoing the process of calcination, form a stable compound with the oxide of the base. It will be understood therefore that the oxides become (and are, when introduced into the vehicle) a compound of the metal occurring in the base. The oxide of the base chosen must possess good covering capacity, and satisfy all the requirements of a good pigment. Throughout the paint all other ingredients, for example, the drier, are compounds of the metal occurring in the base. In considering this case, thoria may be taken for example, as the base of the pigment, and mixed with the filler and other ingredients in the manner more fully described hereafter. Pure silica or kieselguhr in powdered form are used as the filler to form a good pigment, to which, say, thorium silicate or thorium titanate or thorium zirconate may be added. An organic or inorganic salt of the metal of the base is utilized as a drier. The oils and other vehicles are pretreated in the presence of the base used, as hereinafter described. Obviously, on similar lines other oxides may be used instead of thorium oxide. The thorium oxide may be produced in any desired manner, but that prepared in the following manner has been found particularly effective. Obtain freshly precipitated thorium hydroxide and carefully dry it first at 100° C., and then at a slightly higher temperature, say 120° C., and finally pass through a sieve of say, 300 mesh or finer. The thorium oxide so obtained is then calcined with the filler.

The proportions of the constituents of a specific example of paint prepared in accordance with the foregoing example is as follows:—

|  |  | Per cent | Per cent |
|---|---|---|---|
| Pigment, | thorium oxide | 35.80 | 50 |
|  | silica | 14.20 |  |
| Vehicle, | linseed oil | 40.00 | 49.2 |
|  | turpentine | 9.20 |  |
| Drier, | thorium resinate | 0.8 |  |

In this example, the thorium oxide carries the positive charge, while the silica carries the negative charge when in colloidal state.

In another embodiment of the invention, the oxide of the filler has covering power, and is negatively charged, and may in addition be mixed with other negatively charged oxides of metals occurring in the same group of the periodic system as the metal contained in the other constituent of the filler. These oxides, when undergoing the process of calcination, form a stable compound with the oxide of the base. It will be understoood therefore that the oxides become (and are, when introduced into the vehicle) a compound of the metal occurring in the base. As an example, titanium oxide may be named as a suitable filler, satisfying the conditions for covering power and having a negative charge. Magnesia is suggested as a suitable base.

In a paint prepared in accordance with this embodiment of the invention, the proportions of the constituents in a specific example are as follows:—

|  |  | Per cent | Per cent |
|---|---|---|---|
| Pigment, | magnesia | 11.11 | 50 |
|  | titanium oxide | 22.22 |  |
|  | silica | 16.66 |  |
| Vehicle, | linseed oil | 40.00 | 49.2 |
|  | turpentine | 9.20 |  |
| Drier, | magnesium resinate | 0.8 |  |

In this example, the magnesia carries a positive charge, and the titanium oxide and silica carry negative charges when in colloidal state.

Referring now to another embodiment of the invention, the pigment contains two oxides of the same element, each having a different degree of oxidation, one being relatively positively charged to the other. The filler comprises the oxide having a negative charge, and may in addition contain other negatively charged oxides of metals in the same group of the periodic system as the metal of the base. These oxides, when undergoing the process of calcination, form a stable compound with the oxide of the base. It will be understood therefore that the oxides become (and are, when introduced into the vehicle) a compound of the metal occurring in the base. To conform with the stipulations already made, all other ingredients (for example, the drier) introduced into the vehicle are produced from compounds of the same metal as forms the base.

As an example of an oxide to satisfy the requirements of this case, titanium trioxide may be mentioned as a suitable base, while titanium oxide is used as a filler, with or without the addition of silica.

In the specific example of paint prepared in accordance with this embodiment of the invention, the proportions of the constituents are as follows:—

|  | Per cent | Per cent |
|---|---|---|
| Titanium trioxide | 32.75 | 50 |
| Titanium oxide | 17.25 |  |
| Vehicle, linseed oil | 40.00 | 49.2 |
| turpentine | 9.20 |  |
| Drier, titanium borate | 0.8 | |

In this example, the titanium trioxide carries a positive charge while the titanium oxide carries a negative charge when in colloidal state.

When carrying the invention into effect in such manner as to incorporate one or other of the foregoing examples, the ingredients of the paint are mixed in molecular proportions in order that upon application of the paint no galvanic action can take place. Special care is taken to calcine the base and filler together, after they have been carefully ground or powdered to pass through a sieve of the desired mesh, say 300 mesh or finer. The pigment so formed is calcined in order to remove the last traces of moisture. After calcination, the resulting product if necessary is again passed through a sieve of fine mesh. The calcination temperature varies for different bases, and the minimum temperatures may be as far apart as 450° C. and 1200° C., depending upon the oxide with covering power used. In the example quoted in the description of the first embodiment of the invention, calcination is carried out at 600° C.

Special care is taken in the production of white pigments as their color can be seriously affected by intermediate reactions or the actions of nitrogen from the air. As some driers do not dry completely throughout the painting layer, and thus tend to produce peeling and other like defects, it is desirable to introduce into the pigments an additional ingredient capable of modifying the action of drying. For example, a phosphate or a borate of the metal chosen as base may be used, and if not volatile at the calcination temperature, can be introduced into the mixture before calcination. Should, however, an organic salt of the metal chosen as base be used as drier, it can only be introduced at a subsequent stage in the making up of the paint. From these remarks it is to be understood that if, for example, a resinate is used as the drier, there is a possibility that drying may be effected too quickly, and should preferably be retarded by the introduction of, for example, a borate of the metal chosen as base. On the other hand, if a borate be used as a drier, and the action of drying be too slow, a phosphate of the metal chosen as base may be added to hasten the drying.

It is of great importance when utilizing oxides of zirconium, titanium, molybdenum, cerium, thorium, tungsten, vanadium, niobium, tantalum or uranium and other metals of the fourth and higher groups of the periodic system that the oil used should receive careful pre-treatment. For example, it is desirable if the oil is to be thickened or polymerized or even boiled in the usual way for the operation to take place without the addition of any oxides or salts not used in the pigment, and preferably in the presence of the base used. Any other ingredients for example, turpentine or other substances used for a like purpose introduced into the vehicle are pretreated on the lines indicated as desirable in the case of the oil. It is desirable that these ingredients be moisture-free. The pigment according to the oil or other vehicles employed will be about 10 per cent to 60 per cent of the total amount of materials used.

In the production of a colored paint, similar precautions must receive consideration, but the calcining temperature is of minor importance. In the production of a white paint, however, on the above lines, the temperature should be kept as low as possible for the calcining of the pigment. Similar conditions will be met with if other oxides of high covering power are used. Titanium titanate is a stable compound possessing in the highest degree the high covering power of titanium oxide, and is particularly useful for the production of the darker shades of paint. The presence of silica or silicates distinctly improves the color, more particularly if lighter shades of paint are required.

What I claim and desire to secure by Letters Patent is:

1. A non-aqueous colloidal lead-free paint, enamel, japan or the like, including a pigment and a vehicle, the pigment comprising a base constitutent and at least one filler constitutent, the oxide of said base constitutent being positively charged relatively to the charge carried by the oxide or oxides forming the filler, and all the constituents introduced into the vehicle being compounds of the same metal as that in the base.

2. A non-aqueous colloidal lead-free paint, enamel, japan or the like, as claimed in claim 1, having a vehicle containing a pigment in colloidal state, which pigment comprises an oxide having a positive charge acting as base and an oxide or oxides negatively charged relative to the base oxide acting as filler, the oxides together forming a compound of the metal of the base, and having at least one drier in the paint or the like, said drier being also a compound of the metal in the base.

3. A non-aqueous colloidal lead-free paint, enamel, japan or the like, as claimed in claim 1, having a vehicle containing a pigment in colloidal state, which comprises an oxide having a positive charge acting as base and a negatively charged oxide or oxides acting as filler, the oxides together forming a compound of the metal of the base, and at least one drier in the paint or the like said drier being also a compound of the metal in the base, the ingredients being mixed in molecular proportions so that upon application of the paint, no galvanic action can take place.

4. A non-aqueous colloidal lead-free paint, enamel, japan or the like as claimed in claim 1, in which all the ingredients of the pigment have been calcined in the presence of the base used.

5. A non-aqueous colloidal lead-free paint, enamel, japan or the like, as claimed in claim 1, in which the vehicles have been pre-treated in the presence of the same base.

6. A non-aqueous colloidal lead-free paint, enamel, japan or the like as claimed in claim 1, including a drier which is moisture-free and is a compound of the metal used in the base of the pigment.

7. A non-aqueous colloidal lead-free paint, enamel, japan or the like as claimed in claim 1 including an additional ingredient capable of modifying the action of drying, said ingredient being moisture-free and being a compound of the metal used in the base of the pigment, said ingredient functioning to thoroughly dry the paint, enamel, japan or the like, when the same is used as a coating.

In testimony whereof I have signed my name to this specification.

DANIEL GARDNER.